Aug. 11, 1959 R. W. WIRTZ ET AL 2,898,830
PHOTOCOMPOSING APPARATUS
Filed June 24, 1958 7 Sheets-Sheet 3

Fig. 4.

INVENTORS.
Robert W. Wirtz
Harold B. Ratcliff
John S. Turner, Jr.
By: Kegan and Kipnis Attys.

# 2,898,830

PHOTOCOMPOSING APPARATUS

Robert W. Wirtz, Watchung, N.J., Harold B. Ratcliff, Peoria, Ill., and John S. Turner, Jr., Fort Worth, Tex., assignors to Wirtz Company, a copartnership Application June 24, 1958, Serial No. 745,795

24 Claims. (Cl. 95—4.5)

This invention relates to the art of printing, to apparatus for photographically producing printed matter, and more particularly to photocomposition apparatus adapted to be operated by a standard typewriter. This application is a continuation-in-part of application Serial No. 485,936 filed February 3, 1955, now abandoned.

Commercial use of printing apparatus for composing printed material requires, among the more important factors, high speed and accurate operation, flexibility in the use of various type fonts, definition of characters (sharpness), and justification and alignment of the printed material. While type slug casting machines achieve much of what is desired, their original costs, and operating and upkeep costs, have caused the printing industry to look to photographic means for composing printed matter.

Present known means for automatically composing printed material photographically, however, have not proved satisfactory. Their complicated working mechanisms or large bulk are far too prohibitive in costs, preventing their general utilization. Moreover, special skills are required for their maintenance and operation, while often the operator is unable to see what is being printed.

Therefore, it is an object of this invention to overcome these and other unfavorable conditions resulting from the use of the previous known machines for photographically composing printed material. To this aim, the invention combines the relative simplicity of typewriting with the adaptability and versatility of photography in order to compose text material.

Another object is to provide apparatus whereby positioning of a photocomposer type segment is accomplished in synchronism with the positioning of a type segment for typewritten text, and by actuation of a single key in a known typewriter.

It is another object of this invention to accomplish the desired synchronized movement by the energization of a single motor control mechanism, with the type segments being locked in position after having reached their respective printing positions. The positioning of the type segment in the typewriter and the printing of the selected character, ordinarily controlled by operator finger pressure, is now controlled by the motor.

A further object of this invention is to provide interchangeable character bearing master type negatives of various prepared fonts for the photocomposition apparatus, and photographing the selected characters while typewritten copy also is made. An independent photocomposer type segment positive positioning means, not affected by the typewriter mechanism, locks the photocomposer type segment in place for proper exposure.

A still further object of this invention is to automatically advance the photocomposer film carriage for each character and word space, and for line feed, regulating the amount of advance in accordance with movement of the typewriter carriage. To this end, the carriages of each machine are tied together, the movement of the film carriage in each instance being effected in relation to the unit width and size of the characters being typewritten.

With the photocomposer carriage adapted to be linked to a typewriter carriage, it is accordingly another object of this invention to provide photocomposition apparatus capable of producing printed copy in conformity with that produced in the parent typewriter. If the typewriter is capable of producing proportionally spaced, justified copy, justified lines and columns or pages of copy for use in connection with any suitable reproduction process are thus produced without the need of any additional apparatus or steps.

Another feature of this invention is to increase the operating speed of the parent typewriter machine, achieving high speed production of the photographed printed material without sacrifice of efficiency.

A still further object of this invention is to provide electrical circuits and controls which assure completion of the printing cycle of a selected character, even though its actuated key is released prior to completion of the print cycle. If an actuated key is held down too long, the circuits and controls also assure that there is no repeat printing of the selected character.

And still another object of this invention is to produce an inexpensive, light and compact photocomposition mechanism having simplicity of construction, fast, efficient and quiet operation, and one which produces a superiorly finished text material while requiring no special type setting skills.

In the present invention these and other objects are met by photocomposition apparatus having a negative bearing frame rotatably controlled by the movement of a type shuttle arm in a parent typewriter machine. A drive motor and control mechanism therefore is provided, acting to move both the negative frame and the typewriter type shuttle to their respective printing points upon the depression of a typewriter key. Between the drive motor and typewriter, an electrical circuit is provided, acting to actuate a lock mechanism as the negative bearing frame and type shuttle reach their respective printing points and to de-energize the drive motor. An optical system furnishes collimated light for the photographic exposure of light sensitive paper or film to the selected character, the exposure occurring after the locking operation. Upon the completion of the printing operations at both the photocomposer and the typewriter, the locking mechanism is released, the carriage escapement is tripped, and the apparatus readied for the next printing sequence.

The foregoing and other objects, advantages and features of construction are described hereinafter in detail with accompanying drawings.

GENERAL ORGANIZATION OF PARENT MACHINE

Apart from specific modifications which are necessary for photographically reproducing type matter for printing processes, the parent machine herein shown is generally similar to the well known form of typewriting machine of the class disclosed in United States Letters Patent Nos. 1,933,570, 2,007,227, 2,405,974, and 2,487,890, such as the machine commercially available under the trademark "Varityper."

Figures 1, 2:
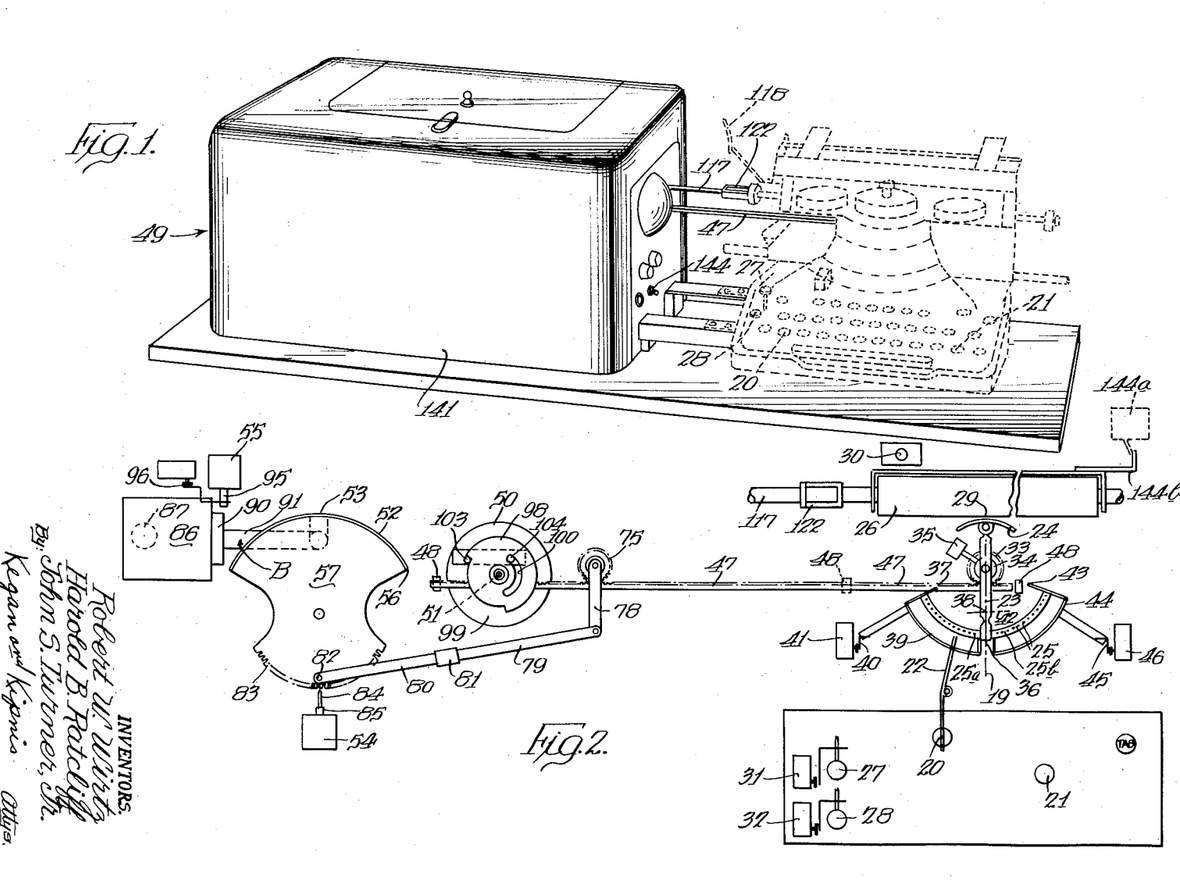
Figure 1 is a general perspective view of the operating apparatus, showing the connections between the photocomposer and the typewriter.
Figure 2 is a plan view illustrating the photocomposer drive mechanism and some of the working parts and additions required in the typewriter, and also showing a modification in dotted lines for typewriters capable of producing justified lines.

Referring to Figures 1 and 2, there are provided the usual keys 20 and 21, key levers 22, and actuating mechanism (not shown) to swing a shuttle or index arm 23 so that it oscillates a type shuttle 24 to position the proper type segments at the printing point of the typing machine. For greater detail see the Patent No. 1,880,592, granted to Trego, October 4, 1932.

Also provided are the usual indexing stop pins 25, one associated with each key lever 22 and operable thereby to project into the path of index arm 23 to accurately position type shuttle 24. The parent machine paper carriage 26 and platen spacing mechanism (not shown) may be of the usual types found in "Varityper" machines; hence, a detailed description of them will not be given since their constructions are well known. To operate shuttle 24 so that other than lower case letters may be positioned at the printing point 29, shift keys 27 and 28 are furnished. Key 27 operates to position type shuttle 24 so that figures may be printed. Operation of key 28 permits the printing of capital letters.

The usual printing hammer (not shown) is further provided to cooperate with the selected type segment to print on the paper. Actuation of the printing hammer occurs after the selected type segment is positioned at the printing point 29, using the usual hammer escapement linkage and newly added printing solenoid 30.

The changes in the typewriter mechanism for photocomposition work are few; and, those that are made are both simple and inexpensive. Added to each shift key 27 and 28 are microswitches 31 and 32 respectively. Also, the conventional index arm of the typewriter is replaced, and index arm 23 is used instead, as shown in Figure 2. The replacement index arm 23 not only carries with it type shuttle 24, but also provides an electrical circuit for the photocomposition attachment, as hereinafter disclosed. Included with replacement index arm 23 as a unit are a drive pinion 33, a slip ring 34, an electrical brush contact 35, and a position indicating electrical contact 36.

Pivotally mounted to the typewriter frame at 37 and 38 is a universal left key bar 39 which carries with it a switch control 40. As a key 20 on the left side is actuated, it raises a key bar 39 which through switch control 40 closes a motor microswitch 41. Similarly mounted to the typewriter frame at 42 and 43, a universal right key bar 44 carries a switch control 45. Operation of a key 21 on the right side of the keyboard similarly raises a right keybar 44 to operate a motor microswitch 46.

Newly added rack 47 is mounted in the Varityper to engage with drive pinion 33. The rack 47 is provided with bearing supports 48 and supplies a means to bring a connection directly from the position of index arm 23 to the photocomposing unit 49. This, in turn, permits proper character selection on the photocomposer 49.

The original hammer release linkage of the typewriter is retained and a printing solenoid 30 added, obviating the necessity of "bottoming" the key in order to achieve printing of the selected character.

Photocomposer

Referring to Figures 2 through 6, among its features the photocomposer, indicated generally at 49, embodies a master type slide assembly and actuating mechanism A, an optical system B, motor drive and control mechanism C for both the photocomposer 49 and the parent machine, and a film feed and carriage assembly D.

As best shown in Figure 2, when a key 20 or 21 is depressed either motor microswitch 41 or 46 is closed to energize a drive motor 50 which moves rack 47 through pinion 51. Index arm 23 thereupon is swung about its pivot by pinion 33 until stopped by a raised index stop pin 25. As index arm 23 pivots, motion is transmitted to the type slide 52 and the proper character to be photographed is positioned at photocomposer print point 53. A latch solenoid 54 is energized when contact 36 hits a raised pin 25, and its operation de-energizes drive motor 50. Latch solenoid 54 is provided to lock type slide 52 in place and further to energize a shutter solenoid 55 in the optical system B to complete an exposure. After exposure, drive motor 50 is energized to return both index arm 23 and type slide 52 to their respective neutral position.

Since the parent typewriter machine shows a copy of what is being photographed in photocomposer 49, the operator is able to see what is being printed at all times.

When using a typewriter which is capable of producing justified copy, a switch 144a (shown in dotted lines in Figures 2 and 7) is placed in the typewriter in order to inactivate the electrical lamp equipment in photocomposer 49 during the printing of the first unjustified line. The switch 144a is closed mechanically by an arm 144b on the typewriter carriage assembly as the operator prepares to make the second or justified copy of a line, and is opened as the carriage is returned to starting position.

Figure 7:
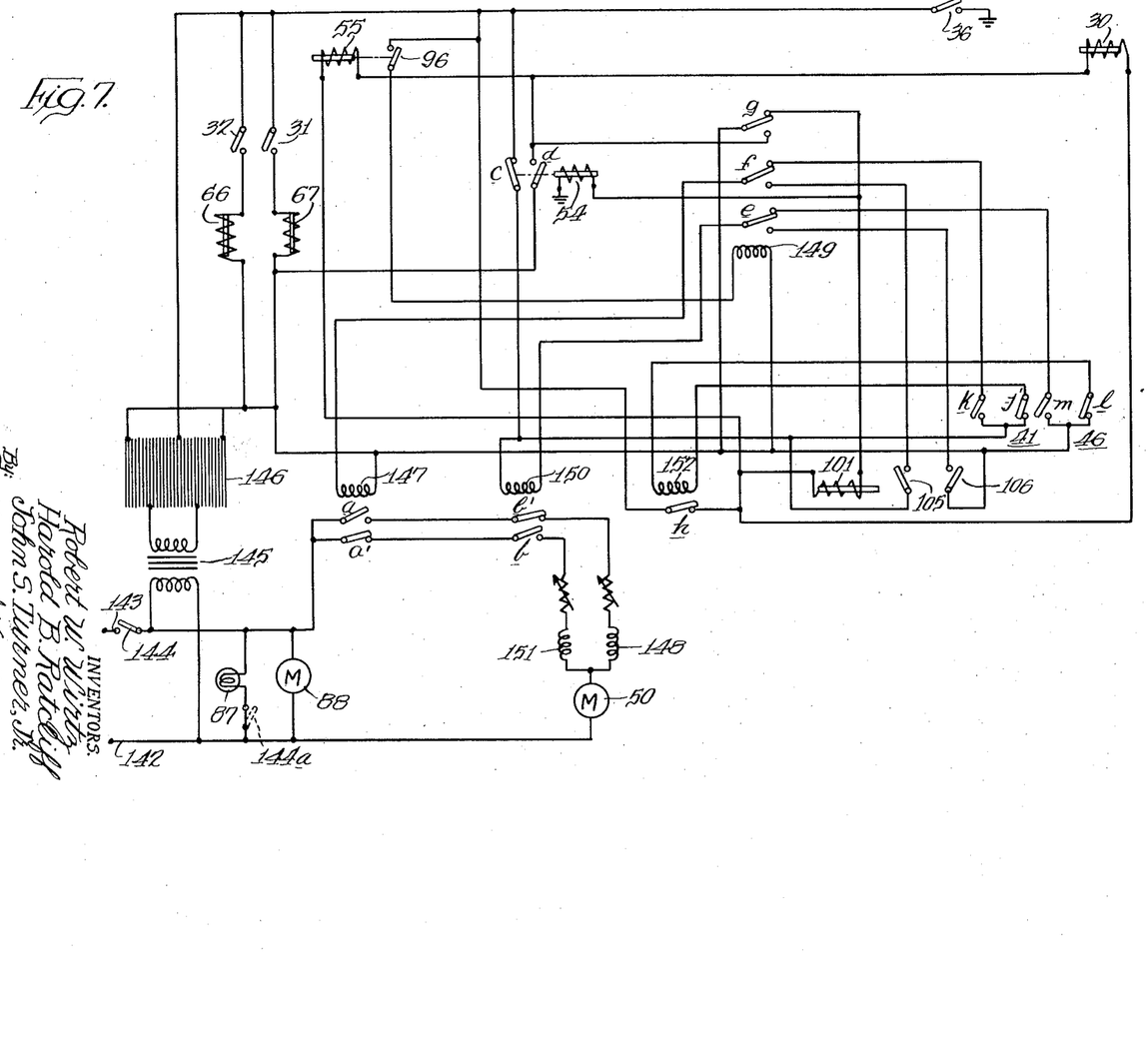
Figure 7 is a circuit diagram showing in a schematic way a preferred form of circuits with certain mechanisms, constructed and arranged in accordance with this invention.

Briefly, the operation when justified lines are printed is as follows: the desired line-length is selected, and the first unjustified copy of a line is typed until the set line limit is neared. By pressing the "TAB" key, the carriage moves to a predetermined stop, while at the same time arm 144b closes switch 144a to complete the circuit to the electrical lamp equipment in photocomposer 49. The second or justified copy of the line is then produced both at the typewriter and in photocomposer 49, after which the carriage is returned to its starting position. As the typewriter carriage is returning to its starting point, arm 144b opens switch 144a so that the photocomposer electrical lamp equipment will not operate during the first printing of the next line. For greater detail of one form of justification mechanism and operation, see United States Letters Patent No. 2,405,974, granted to Norton.

Type slide mechanism

Figure 3:
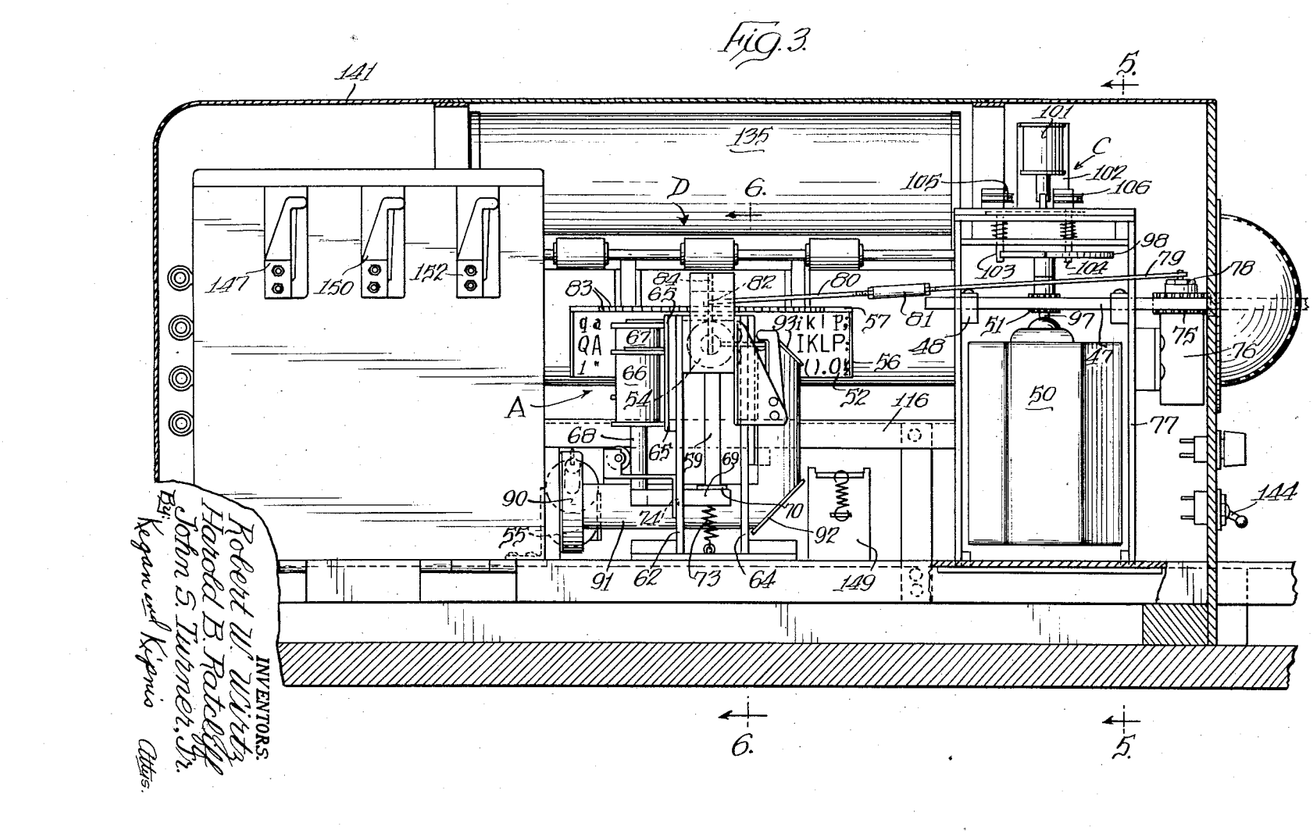
Figure 3 is an elevational view looking into the front of the photocomposer.
Figure 4:
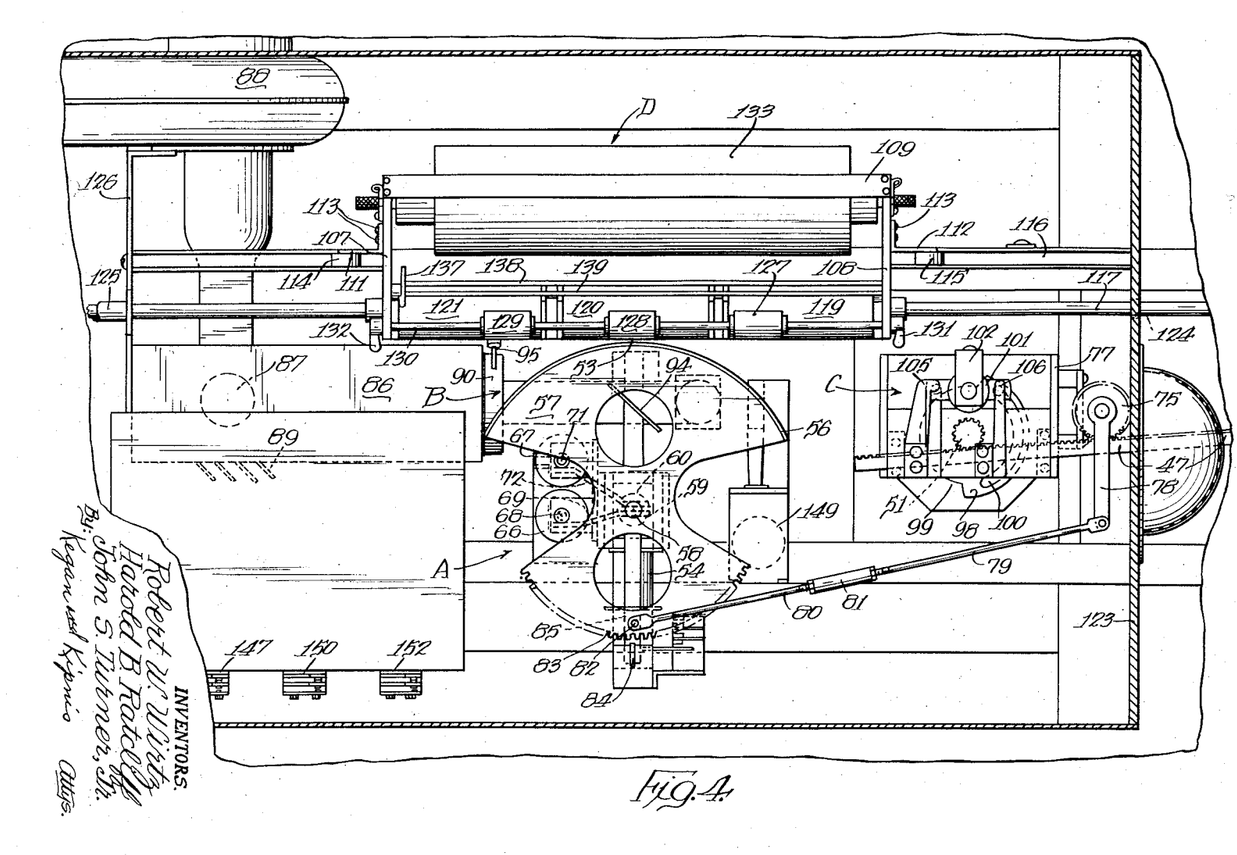
Figure 4 is a fragmentary plan view of the photocomposer.
Figures 5, 6:
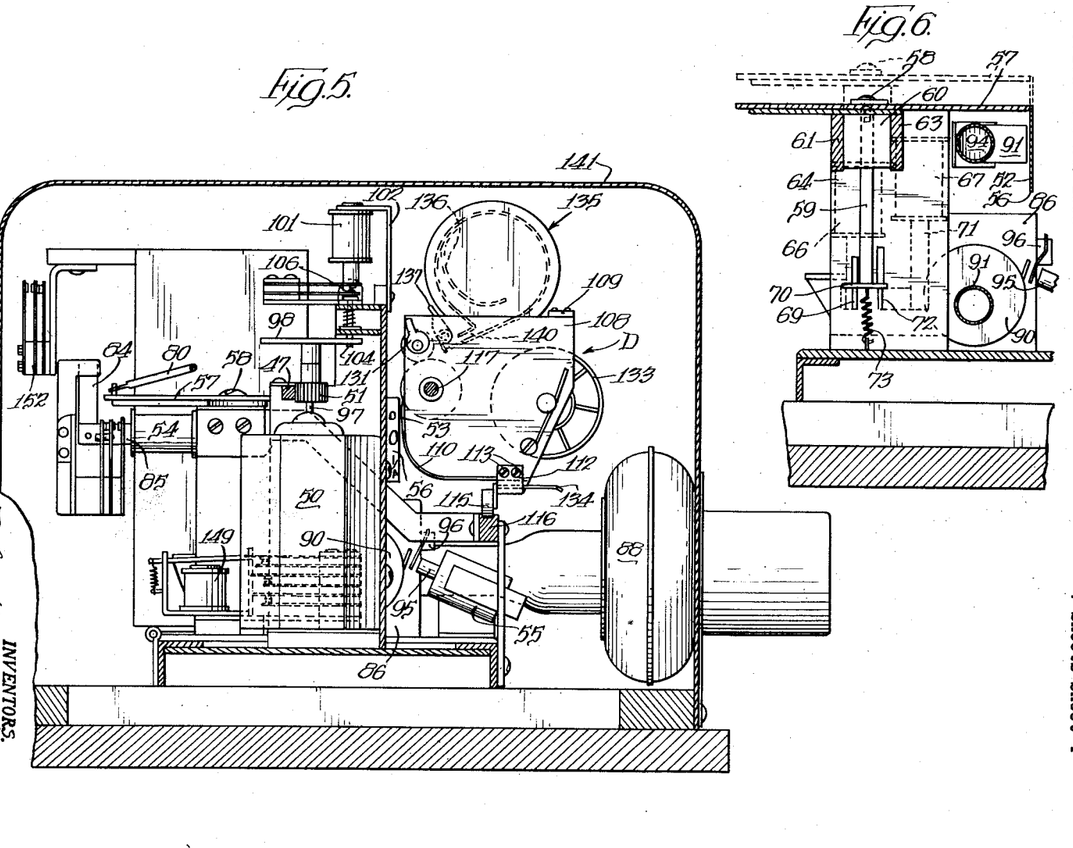
Figure 5 is a sectional view taken along lines 5—5 in Figure 3.
Figure 6 is a fragmentary sectional view taken along lines 6—6 in Figure 3.

Referring in detail to Figures 3, 4, and 6, the type slide and actuating mechanism A comprises a master type negative slide frame 56 to hold the negative type slide 52 and dependingly mounted upon a disc shaped member 57. Negative bearing printed characters of various sizes and faces are easily interchanged in frame 56. Member 57 is secured by a rivet 58 to a rod 59 and is free to pivot and move axially in a guide collar 60 between mounting walls 61, 62, 63, and 64. Mounted to wall 62 by means of bracket 65 are solenoids 66 and 67, used to position disc member 57 vertically, positioning type slide 52 to print capital letters or figures as selected on the keyboard. As solenoid 66 is energized, its plunger 68 pulls an arm 69 upwardly. Arm 69 is adapted to engage a platform 70 secured to rod 59, in turn raising disc 57 sufficiently to permit printing of capital letters. The energizing of solenoid 67 permits its plunger 71 to pull an arm 72 up to hold the disc 57 in position for figure printing. As best seen in Figures 3 and 4, arms 69 and 72 extend beneath platform 70 so that they push it upwardly as their respective solenoids are energized. A tension spring 73 is provided to supply sufficient bias to enable rod 59 to return to its normal position, thus allowing the exposure of lower case letters. An aperture 74 is provided in wall 62 to permit arms 69 and 72 to project therethrough to rod 59.

A drive pinion 75, as shown in Figures 3 and 4, is rotatably mounted to a wall bracket 76 on the mounting wall 77, engaging rack 47 to supply oscillating motion to disc 57 through a lever arm 78 rigidly secured to pinion 75, and through a pair of rods 79 and 80. A turnbuckle 81 is provided to permit adjustment of the rod connection to disc 57, assuring synchronization of movement between index arm 23 and disc 57. Rod 80 is pivotally connected to disc 57 by a pin 82. V-shaped notches 83, formed over a portion of disc 57, are adapted to be engaged by a locking bar 84 which is actuated by the plunger 85 of latch solenoid 54. Bar 84 is of sufficient length to engage the notches 83 throughout the range of their vertical travel. As bar 84 engages a notch 83, a final positioning movement is imparted to slide 52 to accurately position the slide at photocomposer print point 53.

Negative type slide 52 is a photographic negative image of alphabetical characters and symbols formed in parallel rows, and lines each corresponding to one of said notches 83; preferably, it is printed on dimensionally stable vinyl approximately .060 inch thick. A coating of vinyl lacquer is preferably applied over the image for protection against normal abrasion. Being very thin, a large number of slides 52, bearing different size characters and different forms of type, may be stored in a small area within photocomposing unit 49.

Optical system

The optical system B, shown in Figures 2, 3, 4, and 5 comprises a light house structure 86, housing continually lighted lamp 87, and cooled by an exhaust blower 88. Louvres 89 are provided in the side of housing 86 to permit air to pass therethrough. Shutter solenoid 55 is mounted on the back side of housing 86, controlling the operation of a shutter 90. Opening of shutter 90 permits collimated light to pass through a closed tubing 91 with the aid of a plurality of mirrors 92, 93, and 94, thereby exposing the film to the selected character. Closing of shutter 90 stops passage of all light to the photocomposing printing point 53. Near the end of its travel, the plunger 95 of solenoid 55 closes a microswitch 96, completing the electrical circuit for the reversing operation to return disc 57 and index arm 23 to center, as more fully explained hereinafter.

Drive mechanism

Motor drive mechanism C, shown in Figures 2 through 5, comprises a 115 volt A.C. motor 50 connected to both the parent machine and photocomposer 49 through pinion 51, on the motor output shaft 97, and rack 47. Riding upon output shaft 97 and secured thereto is a neutral position cam 98, the outer circumferential surface of which is cut out as indicated at 99 (Figure 4). Figures 2 and 3 show motor 50 and cam 98 in neutral position. Also provided in cam 98 is a cut-out area 100. A motor release solenoid 101, mounted on a bracket 102, is adapted to cooperate with two spring loaded pins 103 and 104 to form an effective motor stop. The closing of either motor microswitch 41 or 46 energizes motor release solenoid 101, thereby lifting both pins 103 and 104 and permitting motor 50 to rotate. Pins 103 and 104 are positioned above cut-out portions 99 and 100 respectively, enabling one pin to ride on the face of cam 98 while the other pin falls within its respective cam cut-out portion during the time motor 50 is returning to its neutral position.

Briefly, the operation of the drive mechanism C is as follows. Assuming that a key 20 on the left side of the keyboard has been actuated, motor microswitch 41 is closed, thereby energizing motor release solenoid 101 and raising pins 103 and 104. Motor 50 thereupon is permitted to rotate clockwise, as viewed in Figure 2. When the proper character is positioned for printing, solenoid 101 is de-energized, thereby dropping the spring loaded pins 103 and 104. Pin 104 drops on the face of cam 98, completing an electrical circuit through a contact 106 to condition motor 50 to rotate counter-clockwise to return to neutral position. In the meantime, pin 103 falls within cut-out portion 99, acting to stop neutral position cam 98 upon motor 50 reaching neutral position. Similarly, operation of a key on the right hand side of the keyboard rotates motor 50 counter-clockwise, allowing pin 103 to complete the necessary electrical circuits through a reverse contact 105 for clockwise return operation, with pin 104 acting as the motor stop pin.

Photocomposer film feed and carriage mechanism

Referring to Figures 1, 3, 4, and 5, the photocomposer film carriage mechanism D comprises a pair of end members 107 and 108 rigidly secured together by a cross piece 109 at the top and by a metal film guide 110 at the bottom. Bearing brackets 111 and 112 are attached to ends 107 and 108 respectively by conventional means, such as the rivets 113. Roller bearings 114 and 115, carried by brackets 111 and 112 and riding upon a track 116, provide means for the film carriage assembly D to move for character and word spacing. A rigid feed rod 117, secured to film carriage assembly D and extending therethrough, is attached at one end to the carriage of the parent machine.

Movement of the carriage of the parent machine causes axial movement of rod 117, in turn moving film carriage assembly D. With such a rigid attachment, use of the line feed and carriage return lever 118 on the parent machine causes return of the carriage assembly D in the photocomposer unit 49. At the same time, film feed will be accomplished by means of a plurality of film feed or metering rollers 119, 120 and 121, non-rotatively secured to rod 117. A coupler 122 (Fig. 1) is provided, permitting decoupling of the parent machine from the photocomposing unit 49.

The end wall 123 of the photocomposing unit 49 is provided with a sufficiently large aperture 124 to permit rod 117 to pass therethrough. At its far end rod 117 is supported by a guide tube 125 secured to a frame member 126.

Three pressure rollers 127, 128 and 129, carried by a shaft 130 fixed between end members 107 and 108, are held against film metering rollers 119, 120, and 121, preventing slippage of the film during film line feed. To permit threading of the film between the metering rollers and pressure rollers, pressure release levers 131 and 132 are attached to shaft 130. The pivotal axes of levers 131 and 132 are offset from shaft 130, permitting a toggle action to move shaft 130 and separate pressure rollers 127, 128 and 129 from rollers 119, 120, and 121.

Film travel is from a supply magazine 133, between the film guides 110 and 134 to the photocomposer printing point 53. From printing point 53, the film travels between the metering and pressure rollers to the film take-up magazine 135 mounted at the top of film carriage assembly D. A spring 136 keys the exposed film to a smaller diameter than that of magazine 135, and, hence, prevents binding of the film.

To process and develop the exposed film, sufficient additional film is advanced to assure that all exposed film is in take-up magazine 135. A cutting edge 137, held between two guides 138, 139, may then be moved across the film, severing the exposed from the unexposed film. The leading edges of magazine 133, indicated generally at 140, are provided with felt or other suitable material which may be used as a light-lock. Photocomposer cover 141 prevents outside light from exposing the film as it travels within the photocomposer 49.

*Operation and circuit diagram*

Referring now to Figure 7, the apparatus is supplied with power from line wires 142 and 143 through a switch 144. The drive motor 50, lamp 87, and fan 88 operate directly off the 115 volt A.C. line. A transformer 145 and a rectifier 146 furnish 12 volt D.C. to the remainder of the electrical circuits in the apparatus.

The operation of any of the character keys 20 or 21 energizes the motor 50 which drives the parent machine type shuttle 24 and the photocomposer film type slide 52 to their appropriate positions while establishing the correct electrical circuit to complete the selected character printing cycle. Again, assuming a character on the left side of the keyboard is selected, the complete operation of the apparatus is as follows:

Depression of key 20 raises key bar 39, thereby actuating key operated motor microswitch 41, closing a contact $k$ and opening a contact $j$, and completing a circuit through contact $k$ to a clockwise motor control relay 147. Actuation of relay 147 closes the contact $a$ while opening the contact $a'$, completing the electrical circuit to the clockwise field winding 148 of motor 50. Closing of microswitch 41 also energizes motor release solenoid 101, raising stop pins 103 and 104 and freeing motor 50 to rotate. The clockwise rotation of motor 50 drives type shuttle 24 and type slide 52 to their respective printing positions. An index stop pin 25, raised mechanically by key lever 22, acts to stop the movement of index arm 23, completing an electrical circuit through slip ring 34, brush contact 35, position indicating contact 36 through ground to energize latch solenoid 54. Energizing latch solenoid 54 causes plunger 85 to move bar 84 and locks disc 57 in place. Solenoid plunger 85 also opens latch contact $c$, de-energizing relay 147, opening contact $a$ and closing $a'$, thereby de-energizing motor 50. Simultaneously, plunger 85 closes latch contact $d$, completing circuits to the typewriter print solenoid 30 and photocomposer shutter trip solenoid 55 to actuate the printing operation in both units.

A further movement of shutter solenoid plunger 95 closes shutter microswitch 96, energizing a reverse relay 149. Contact $g$ of relay 149 thereupon opens, breaking the circuits to latch solenoid 54 and motor release solenoid 101. Also, the normally opened contacts $e$ and $f$ of relay 149 are closed, operating to shift the control of motor control relays 147 and 150 from microswitches 41 and 46 to reverse contacts 105 and 106. Relay 149 further serves to complete a holding circuit for shutter solenoid 55 and print solenoid 30, by shifting control over the solenoids from latch contact $d$ to reverse relay contact $g$. This assures that the operation of both solenoids will not be interrupted before the completion of their respective printing operations. Thus, completion of the printing operation, both at the parent machine and photocomposer, is assured, even though the actuated key is released prior to the completion of the printing operations.

Breaking of the electrical circuit to motor release solenoid 101 permits spring loaded pin 103 to fall within aperture 99 so that it may act as a stop means when motor 50 is returned to its neutral position. Pin 104, however, is forced to ride upon the face of cam 98, maintaining reverse contact 106 in closed position, and thereby completing the circuit to counterclockwise motor control relay 150. Operation of relay 150 completes the desired electrical circuit to the counterclockwise field winding 151 by opening contact $b'$ while closing $b$, permitting motor 50 to return to neutral position (see Fig. 2).

With latch solenoid 54 de-energized and the circuit established to drive motor 50 to neutral position, the apparatus is returned to its starting position. Pin 104 is permitted to fall within cutout portion 100 as neutral position cam 98 reaches its original position, thereby allowing reverse contact 106 to open, breaking the electrical circuit to counterclockwise relay 150. Contact $b$ thereupon opens, while contact $b'$ closes, and drive motor 50 is de-energized.

Similarly, depression of a key 21 on the right hand side of the keyboard of the parent machine actuates microswitch 46, closing a contact $m$ and opening a contact $l$. This completes an electrical circuit through counterclockwise motor control relay 150, closing contact $b$ and opening contact $b'$, thereby energizing the counterclockwise motor field winding 151. At the same time, motor release solenoid 101 is energized, raising pins 103 and 104, freeing motor 50 to rotate counterclockwise to position index arm 23 and type slide 52.

At the completion of the printing cycle, which is the same as when a left hand key 20 is depressed, pin 103 drops on the surface of cam 98, while pin 104 falls within opening 100. Reverse contact 105 is thereby maintained closed to energize clockwise motor control relay 147, closing contact $a$ and opening contact $a'$ to complete the electrical circuit to the clockwise field winding 148 of motor 50. The apparatus is then returned to neutral position, with pin 103 dropping into opening 99, permitting reverse contact 105 to open and break the electrical circuit to relay 147. Contact $a$ opens while contact $a'$ closes, readying the apparatus for the next printing operation.

To prevent repeat printing of a character at either the parent machine or the photocomposer 49 when its key is held down, an anti-recycling relay 152 is provided in series with the normally closed contacts $j$ and $i$ of microswitches 41 and 46. As key 20 in the left side of the keyboard is depressed, contact $j$ is opened, interrupting the current to de-energize relay 152. With latch solenoid 54 actuated and its contact $c$ opened, relay 152 continues to be de-energized regardless of the position of key 20. The normally opened contact $h$ of relay 152 thus is closed during the period when relay 152 is de-energized.

Contact $h$ remains closed a sufficient time to permit the printing operation in both machines, preventing further printing until a key is again depressed. As latch solenoid 54 is de-energized, contact $c$ returns to its normally closed position, thereby permitting relay 152 to be re-energized as soon as contact $j$ is closed. Contact $h$ thereupon opens.

With contact $h$ open, the electrical circuit to shutter solenoid 55 is broken, spring loaded plunger 95 returns to its normal position, permitting shutter switch 96 to open. Opening of switch 96 in turn cuts the circuit to reverse relay 149, permitting the $e$, $f$ and $g$ contacts to return to their normal position.

*Non-centering index arm*

Since the parent machine is designed to have the index arm approach the stop pins from only one direction, it is necessary to return index arm 23 to center after each character printing operation, thus greatly limiting speed of operation. The parent machine, however, may be adapted to operate without returning its index arm to center after each printing operation. This new operation utilizes a novel compensating device which allows correct printing with the index arm structure approaching a stop pin 25 from either direction.

In the usual parent machine, such as shown in Figure 2 herein and also in Figure 2 of Trego, No. 1,880,592, a rigid dimensional relationship exists between the spacing between the first type segments on either side of an imaginary center line 19, the width of the shuttle arm, and the spacing between the first stop pins on either side of center line 19. The arc between the first type segment on either side of center line 19 is smaller than the arc between stop pins 25a and 25b by an amount that must approximate twice the radius of the stop pins plus the width of arm 23 at the points where it hits the pins.

This relationship, however, may be changed to permit the compensating arm to approach the stop pins from either direction, the center line of the modified compensating arm employed for this purpose always is aligned with the axis of an actuated stop pin when the arm comes to rest, as hereinafter more fully explained. Consequently, either the two sections of stop pins must be moved closer together, or the two halves of the type segment must be moved further apart, in order to permit alignment of the modified compensating arm center line with the axis of all pins and thus achieve correct printing. Since the manufacture of the type segments is more easily altered, the latter choice is more feasible.

Referring to Figures 8 to 11, the compensator index arm assembly comprises the pinion 33 to which a limit bar 201 is rigidly secured at its hub or pivotal end 202. An insulated slip ring 203 is provided about part of the circumferential surface of end 202, allowing continual contact with a brush 204. A position indicating contact bar 205 is pivotally mounted above limit bar 201, insulated therefrom, as well as from the rest of the apparatus, and extends beyond end 206 of bar 201. At end 206, limit bar 201 has a frame structure 207 to restrict the pivotal movement of contact bar 205. Adjustable stops 208 and 209 are mounted on the ends 210 and 211 of the frame 207, respectively, allowing adjustment to control the limit of movement of contact 205. Centering spring 212 tends to center contact bar 205 on the center line 213 of the compensating index arm assembly. An arm 214, rigid with bar 201, holds type shuttle 24a in the parent machine.

Ordinarily, in the device shown in Figure 2, if an index arm 23 were to approach a raised stop pin 25 in a clockwise direction, it would stop type shuttle 24 in one position at printing point 29. If, however, arm 23 were to approach the same stop pin 25 in a counterclockwise direction, it would stop type shuttle 24 at an entirely different position than printing point 29, the difference in positions being caused by the width of the pin plus the width of arm 23. By using the compensating device shown in Figure 8, positioning of the desired character to be printed is always at the same point, whether the stop pin 25 is approached by position indicating contact 205 from a counter-clockwise or from a clockwise direction. After position indicating bar 205 comes in contact with stop pin 25, setting up the necessary electrical circuits, the rotation of limit bar 201 is continued for a short time, as will be more fully explained hereinafter. The principle relied upon is that at final positioning, the compensator line of center 213 is always aligned with the axis 214a (B) of the actuated stop pin 25.

Figures 8, 10, 11, 12:
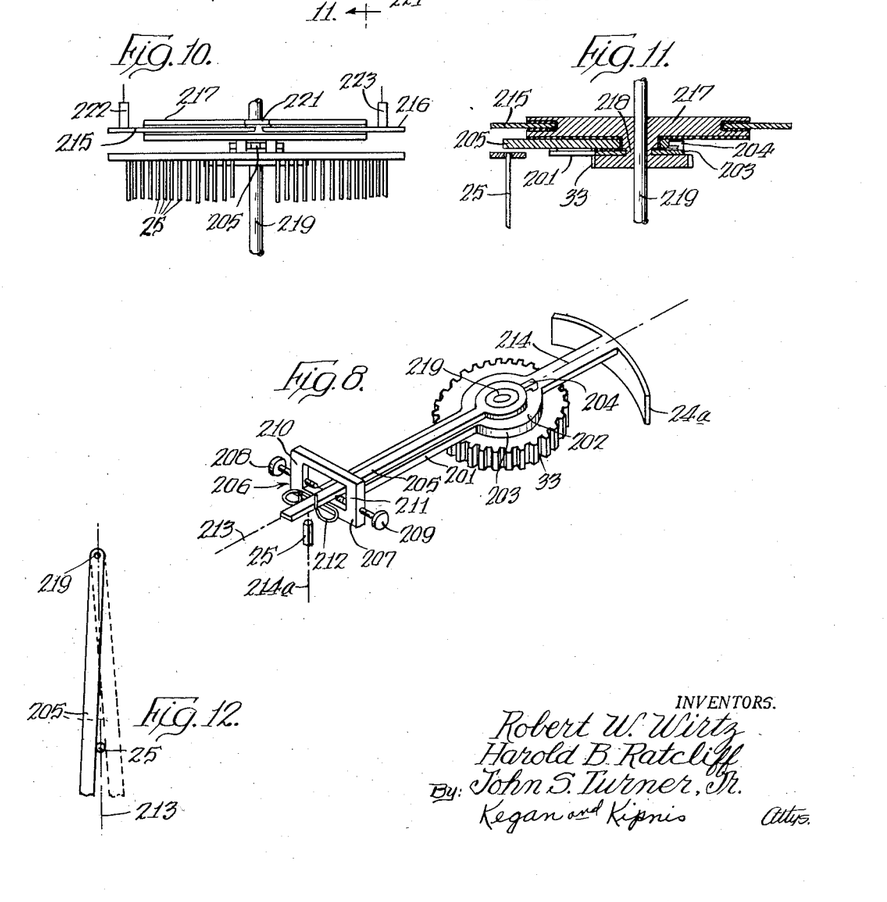
Figure 8 is a perspective view of a modified type shuttle assembly for the typewriter.
Figure 10 is a view taken along lines 10—10 in Figure 9.
Figure 11 is a sectional view taken along lines 11—11 in Figure 9.
Figure 12 is a partial diagrammatic representation of the final positioning of the modified type shuttle arm.

Mounted above pins 25 and adapted to be engaged thereby upon the depression of keys 20 or 21 in the parent machine are two control sectors. A control sector 215, when engaged by raised stop pin 25, completes the necessary electrical circuit to drive the apparatus in a clockwise direction; a second control sector 216, when engaged by a stop pin, completes the necessary circuit to drive the apparatus in a counterclockwise direction. Sections 215 and 216 are supported in a mounting structure or bushing 217, insulating them from each other and from the rest of the apparatus. Portion 218, integral with structure 217, permits a rigid connection to limit bar 201. As best shown in Figure 11, the pinion 33, and limit bar 201 and support structure 217 connected thereto, are rotatably mounted on shaft 219 in the parent machine, while position indicating bar 205 is rotatably mounted on portion 218. Projections 220 and 221 are provided in structure 217, maintaining the spaces between sectors 215 and 216 free from dirt and other objectionable matter.

Figure 9:
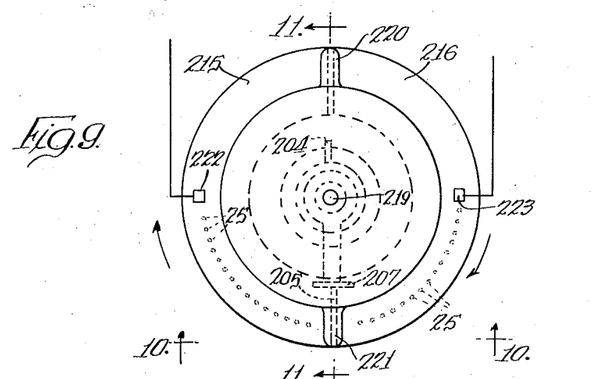
Figure 9 is a plan view of the modification with electrical connections.

Figure 9 shows the control sectors 215, 216 in a neutral or starting position, although it is to be understood that the apparatus may be started in any position. From such position, the sectors, together with position indicating bar 205 and compensator apparatus, may rotate approximately 90° in either direction. No matter where the position of sectors 215, 216 is, however, a stop pin 25 which engages sector 215 conditions the apparatus to rotate clockwise, while a pin 25 which hits sector 216 conditions the apparatus to rotate counter-clockwise. A pair of brush contacts 222, 223, associated respectively with sectors 215 and 216, complete the electrical circuit from the actuated stop pin 25 to the correct field winding in drive motor 50. Pinion 33 and the apparatus associated therewith are driven by drive motor 50 through rack 47, as similarly disclosed in Figures 2 and 3. Neutral position cam 98 and its related stops and contacts are eliminated, however, since the modified structure is designed to approach the stop pins from either direction.

Figures 13, 14:
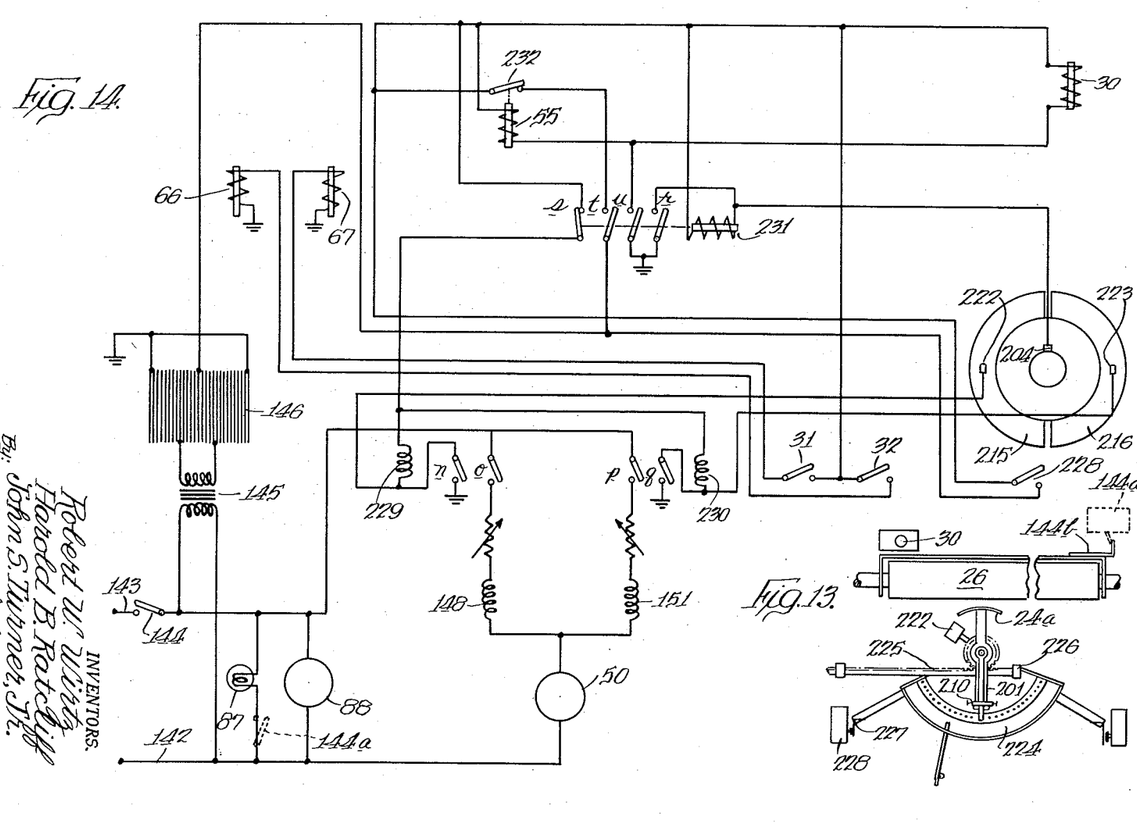
Figure 13 is a view similar to Figure 2, showing the modified structure installed in a typewriter.
Figure 14 is a circuit diagram of the apparatus with the modified structure installed.

As shown in Figure 13, a single universal key bar 224, pivotally mounted in the parent machine at 225 and 226 is adapted to be engaged by lever 22 of any depressed key. Raising of bar 224 causes a switch control 227 to close an anti-recycle switch 228. Switch 228 remains closed as long as the actuated key is depressed.

It is obvious that the compensator apparatus shown in Figure 8 may be used with the typewriter alone, and that its utility is not limited to the times when the two machines are used together. As a result, the speed of the typewriter is greatly increased, since the shuttle arm need not be returned to neutral position after each printing operation. Also, when used in a typewriter capable of producing justified copy, the compensator apparatus operates during the first as well as during the second typing operation, whether the typewriter is used with the photocomposer or used alone.

*Modification operation*

Referring to Figure 14, the printing cycle is initiated by depressing a character key on the parent machine, thereby closing anti-recycling switch 228 to complete an electrical control circuit. Contact by the raised stop pin 25, associated with the selected character key, with either control sector 215 or 216 (depending upon which sector is above the actuated pin) completes the necessary electrical circuit to either relay 229 or 230 to rotate motor 50 in the required direction. Relay 229, in series with sector 215, has two normally opened contacts, $n$ and $o$, which close upon the relay becoming energized. Contact $n$ acts to lock the relay in, while contact $o$ completes the circuit to clockwise motor field winding 148. Similarly, relay 230 is in series with sector 216 and has two normally opened contacts. Contact $p$, when closed, completes the electrical circuit to counterclockwise field winding 151 of motor 50, while contact $q$ acts to latch in relay 230.

Drive motor 50, through rack 47, moves type shuttle 24 in the parent machine and negative type slide 52 in photocomposer 49 towards their respective printing positions. As contact bar 205 hits the raised stop pin 25, an electrical circuit is completed through slip ring 203, brush contact 204, and a latch solenoid 231 (which operates similar to solenoid 54) to ground, thereby energizing latch solenoid 231 to lock disc 57 in place. As solenoid 231 causes locking bar 84 to engage the V-shaped notch 83 on disc 57, a final positioning movement is thus imparted to (B) type slide 52 to accurately position the slide at printing point 53 in the photocomposer.

In the parent machine this final adjustment also is imparted to type shuttle 24 through rods 79, 80, lever arm 78, and rack 47 to pinion 33, causing limit bar 201 to turn slightly relative to position indicating bar 205 (which remains stationary and abutting stop pin 25). At the point where the compensator's line of center 213 becomes aligned with the stop pin axis 214, movement of limit bar 201 is stopped, and type shuttle 24 thus is accurately positioned at printing point 29 in the parent machine. Adjustable stops 208 and 209 provide a means of accurately limiting the relative movement of limit bar 201 with respect to indicating bar 205, further assuring correct positioning of the selected character at printing point 29. The final positioning of type shuttle 24 in the parent machine also may be achieved by providing a latch and slot arrangement on arm 205 which is similar to that in the photocomposer.

Latch solenoid 231 also operates four contacts $r$, $s$, $t$ and $u$, three of which are normally opened while the fourth is normally closed. Normally opened contact $r$ when closed is effective to ground one end of the latch solenoid 231. The opening of normally closed contact $s$ breaks the electrical circuit to motor control relays 229 and 230, de-energizing drive motor 50. Normally opened contact $t$, in parallel with anti-recycle switch 228, when closed also serves to lock in the electric control circuit until the entire printing cycle is completed. And, the closing of normally opened contact $u$ completes the electrical circuits to photocomposer shutter solenoid 55 and to print solenoid 30 in the parent machine.

Near the end of the travel of shutter solenoid plunger 95, a normally closed switch 232 (which operates similar to microswitch 96) is opened. If the depressed key has been released, the control circuit is de-energized. If the key is held down, however, switch 228 maintains the control circuit potential, and, in turn, latch solenoid 231 remains energized. As long as solenoid 231 is energized, contact $s$ remains open, preventing drive motor 50 from turning and recycling. Therefore, before a new printing cycle can be initiated, both anti-recycle switch 228 and switch 232 must be opened to break the control circuit and de-energize solenoid 231.

Such an arrangement prevents recycling even if the key is held down over a long period of time; until the depressed key is released, solenoid 231 remains energized, completing the electrical circuit to shutter solenoid 55 and solenoid 30, and preventing reset until the key is released. Further, the arrangement assures that the control circuit is held in until the completion of the printing operation, utilizing contact $t$ in parallel with anti-recycle switch 228. Thus, even though the key is released, the circuit from stop pin 25 is broken, and switch 228 is opened, latch solenoid 231 remains energized, since contact $r$ is closed. Only after shutter solenoid plunger 95 opens switch 232, breaking the circuit to latch solenoid 55, and after the key is released, is the apparatus prepared for the next printing operation.

After the actuated key is released and the raised stop pin 25 falls back to its normal position, spring 212 in the compensator apparatus moves position indicating bar 205 into alignment with the center line 213 and directly above the formerly raised pin 25. If a double character printing is required, type shutter 24 and negative type slide 52 are both correctly positioned at their respective printing points 29, 53. As pin 25 is raised for the second printing, its movement is intercepted by position indicating bar 205, thereby immediately energizing solenoid 231 to start the printing operation.

The invention is not limited to the specific device described above. Since it may be described in a variety of expressions, it is to be understood that the embodiment herein described is for the purpose of illustration only, and not intended to limit and define the invention.

We claim:

1. A keyboard actuated photocomposer, comprising a set of actuating character keys, an exposure shuttle having a set of characters thereon related to said character keys, a film holder, a light projection system arranged to pass light through a part of said exposure shuttle to film in said film holder, a shutter mechanism to prevent unwanted film exposure, a drive motor energizable by operation of said character keys, mechanism connecting said drive motor to said exposure shuttle for movement thereof, a set of actuatable indexing devices, actuating mechanism connecting each indexing device to at least one of said character keys, a movable bar adapted to engage any actuated indexing device, means connecting said drive motor to said bar, a set of locking means on said exposure shuttle corresponding to the characters thereon, a movable control and locking arm, and control means operatively associated with said arm and connected to said drive motor, said bar and said shutter, whereby actuation of an indexing device corresponding to an operated character key predetermines the operation of said drive motor and movement of said exposure shuttle and said bar, contact by said bar with the actuated indexing device energizes said control means, and energization of said control means inactivates said drive motor, moves said arm to engage the locking means corresponding to the exposure shuttle character related to said operated key, and operates said shutter mechanism to photographically expose said exposure shuttle character to said film.

2. In combination, a keyboard-actuated photo-reproducing device of the type wherein character members are selected respectively by successive key operations at the keyboard and are brought to a photo-reproducing position by a character carriage in the order of their selection and contemporaneously therewith, a keyboard electrical contactor and means for actuating it responsive to the character-selecting actuation of any keyboard key of a group and for restoring it upon restoration of the actuated key, motor means responsive to the actuation of the keyboard contactor for moving the character carriage to bring the selected character into reproducing position, an electromagnet and means for operating it responsive to the said movement of the carriage, a first means responsive to the carriage, a first means responsive to the said operation of the electromagnet for reproducing the selected character, and a second means responsive to the said operation of the electromagnet for removing the said motor means from under the control of the said contactor, and means for restoring the said electromagnet upon completion of the said initiated reproducing operation.

3. In a combination according to claim 2, wherein the character carriage is rotatable in either direction from a home position to the reproducing position, a second keyboard electrical contactor and means for actuating it responsive to the character-selecting actuation of any keyboard key of a second group, the said motor means including a reversible motor having alternative drive circuits according to the direction in which it is to move the character carriage, means responsive to the actuation of either keyboard contactor for closing a separate one of the motor drive circuits, whereby the carriage is driven from home position to reproducing position in a direction which depends upon the key group containing the actuated key.

4. In a combination according to claim 3, carriage-controlled means for opening the effective drive circuit upon arrival of the character carriage in reproducing position by travel in either direction, and means including two contactors controlled alternatively according to the direction of movement of the character carriage into reproducing position for closing two homing motor-drive circuits alternatively to drive the character carriage to its home position in a direction opposite to its last direction of movement from home position.

5. In a combination according to claim 2, wherein the character carriage is a rotary carriage which has two directions of movement and which remains in the position of the last use until a further character key is actuated, and wherein the said motor means includes a carriage-drive motor having two corresponding directions of movement, means including contact means controlled jointly according to the last preceding direction of movement and according to the keyboard key next actuated for driving the carriage-drive motor in one direction or the other according to the position of the carriage with respect to the newly selected character.

6. Motion compensator apparatus for use in a photoprinter or the like having a movable font with a set of reproducible characters thereon, comprising: indexing pins selectively operative for positioning corresponding font characters at a reproduction point, a pivotally mounted limit bar, a pivotally mounted index lever engageable with any indexing pin in operative position and arranged for movement relative to said limit bar, means connecting said font and said limit bar whereby said font follows the movement of said limit bar, means releasably constraining said index lever to follow said limit bar, means for pivoting said limit bar independent of said index lever upon the latter striking an operated pin, and means on said limit bar for limiting relative movement between said index lever and said limit bar, whereby after said index lever strikes an actuated stop pin corresponding to a selected character, pivoting of said limit bar continues until said limiting means on said limit bar halts said rotation upon alignment of the selected font character with said reproduction point.

7. Apparatus as described in claim 6 wherein said constraining means includes a spring anchored to said limit bar, straddling said index lever and acting thereon to center said index lever over said stop pin upon said pin again becoming inoperative.

8. In a photocomposer or the like, including a font arranged for angular deflection and having a set of reproducible characters thereon, drive means connected with said font, means for directing said drive means to return said font to a neutral position after the reproduction of each font character, said directing means comprising a disc rotatably driven by said drive means, a pair of arcuate track segments cut in said disc concentric with the axis of rotation thereof, and in different radii, a pair of positionable pins, one engageable in each of said track segments, said pins being so arranged that at any time when said drive means displaces said font from its neutral position, only one pin enters its corresponding track segment while the other pin rests on said disc, means for lifting said pins in coordination with the movement of said font, a control operable by said pins and connected with said drive means, whereby said pins are released after positioning of said font for character reproduction, with one of said pins being maintained by said disc in operative relation with said control means to direct said drive means to return said font to said neutral position, the other of said pins resting within its corresponding track segment to mechanically stop said drive means and said font upon the latter reaching said neutral position.

9. The combination wherein exposure characters are selected respectively by successive keying operations at a keyboard and are positioned at a reproducing station in the same order as their selection and substantially coincidentally therewith, and wherein successive exposure character positioning actions occur without intervening character carriage homing action, an exposure character carriage, a shuttle connected with said carriage to effect positioning thereof, a reversible drive means connected with said shuttle and responsive to said keying operations to move said shuttle and said carriage in either of opposed directions, alternative drive circuits connected with said drive means for use according to the direction in which said carriage is to move, means responsive to each keying operation for selecting and closing the one of said drive circuits which corresponds to the direction in which the carriage is to be moved, said latter means including circuit means controllable jointly by said shuttle according to the position to which it was driven on the last preceding keying operation and by the keyboard location of the key newly actuated, and key-controlled means for stopping shuttle travel when the attained shuttle position corresponds to the operated key.

10. In a combination according to claim 9, an electrical contactor common to all keyboard keys and means to actuate it responsive to each keying operation and to restore it upon restoration of the actuated key, and circuit-controlled means including key-lock means controlled by said contactor for insuring completion of an initiated shuttle-travel operation irrespective either of the release of the last actuated keyboard key or the attempted operation of any other key.

11. In a combination according to claim 10, means for opening the effective drive circuit upon the said stopping of the shuttle, carriage locking structure associated with said carriage for accurately positioning and locking said carriage, and means for operating said carriage locking structure coincidentally with said opening of said effective drive circuit.

12. In a combination according to claim 11, reproduction-control means and means for operating it coincidentally with said operation of the said carriage locking structure to initiate reproduction of the selected exposure character, and means controlled by the last said means for disabling said key-lock means.

13. Automatic indexing apparatus for variably positioning a font for the selective exposure in succession of characters thereon which correspond respectively to individually operable character keys, comprising a shuttle operatively associated with the keys and supported for a back-and-forth character-selecting movement which brings it into successive positions corresponding respectively to the character keys, means establishing an exposure position for the font-carried characters, means supporting the font for a back-and-forth character-selecting movement which brings the characters thereon successively into the exposure position, interlinkage means interposed between the font and the shuttle for correlating their respective said movements, drive means, drive-control means responsive to the temporary operation of any character key for which the shuttle is not currently positioned for causing the drive means to move the shuttle and font in whichever direction of character-selecting movement is required to bring the shuttle into its position corresponding to the operated character key, stop means controlled by the operated key for stopping the shuttle in the shuttle position corresponding to the operated key, means for discontinuing the said action of the drive means when the shuttle has been stopped and for leaving the shuttle in the vicinity of any character-key position in which it has been stopped until a further key operation occurs, whereby the shuttle may require being moved in either direction by the drive means into any intermediate one of the said character-key positions of the shuttle; the font, when being moved to bring any intermediate character thereon into the said exposure position, tending to be stopped by the shuttle in a position peculiar to the direction in which the shuttle is travelling when stopped, yielding means included in the recited structure through which the font is stopped obedient to shuttle stoppage, and means including the yielding means for substantially nullifying the said tendency of the font.

14. Apparatus as described in claim 13, wherein the said shuttle is stopped in positions peculiar to the respective directions of shuttle travel toward the assigned shuttle-stopping position for any intermediate character key, and wherein the said yielding means is included in the said interlinkage means, means causing the said drive means to drive the font independent of the yielding means and to drive the shuttle through the agency of the yielding means.

15. Apparatus as described in claim 13, wherein the said drive-control means includes a forward-drive control means and includes a reverse-drive control means, and means controlled jointly by (1) the shuttle-stopping position of any intermediate character key and by (2) the position along its path of the shuttle when the last said key is operated, for selecting and actuating the forward-drive or the reverse-drive control means according to the direction in which the shuttle is required to be driven to reach a position corresponding to the operated key.

16. In apparatus of the class wherein indexing pins are selectively actuable and position a font to reproduce selected characters and wherein the positions of said pins represent corresponding characters, the improvement comprising: a movable driven member connected with said font, a rotatable bar engageable with any one of said indexing pins and movable relative to said member, means whereby said member and said bar are releasably constrained for movement in synchronism, means for moving said member independent of said bar upon said bar engaging an actuated pin, and means associated with said member for limiting relative movement between said member and said bar, whereby positioning of a font character for reproduction is independent of the direction from which said bar approaches the indexing pin representative of said character.

17. Automatic indexing apparatus for variably positioning a font for the selective reproduction in succession of characters thereon which correspond respectively to individually operable character keys, comprising a finder operatively associated with the keys and supported for a back-and-forth character-selecting movement which brings it successively into positions corresponding respectively to the keys, means establishing a reproduction position for the font-carried characters, means supporting the font for a back-and-forth character-selecting movement which brings the font successively into positions corresponding respectively to the keys, the respectively corresponding characters on the font being thereby brought successively into the exposure position, interlinkage means interposed between the font and the finder for correlating their respective said movements, drive means, drive-control means responsive to the temporary operation of any character key for which the finder is not currently positioned for causing the drive means to move the finder and font in whichever direction is required to bring the finder into its position corresponding to the operated key, stop means controlled by the operated key for stopping the finder in the finder position corresponding to the operated key, the font being responsively stopped in its position corresponding to the same key and with its corresponding font-carried character in the said reproduction position, means for discontinuing said action of the drive means when the finder and font have been stopped and for leaving them in the vicinity of their stopped position until a further key operation occurs, whereby the finder and font may require being moved in either direction by the drive means into any intermediate one of said positions corresponding to a temporarily operated key, the finder being stopped by said stop means of the last said key in two separate positions for that key which are peculiar to the respective directions in which the finder may be travelling when stopped, the font thereby tending to be similarly stopped, yielding means included in said interlinkage means, and means including the yielding means for substantially nullifying said tendency of the font.

18. Apparatus according to claim 17, wherein said stop means comprise a series of stop pins of uniform thickness normally out of the path of the said finder and actuatable individually into such path to extend transversely thereof, the said yielding means including a part fixed with the finder and a coacting part movable with respect to the finder and comprising a link portion of the said interlinkage means, one such part comprising a pair of abutments between which the other part is movable until one abutment or the other is engaged to effect font stoppage, obedient to finder stoppage, by engagement with the side of an actuated stop pin, the distance between the abutments exceeding the thickness of said part movable between the abutments by a distance equal to such thickness, plus said uniform thickness of any said stop pin.

19. Apparatus according to claim 18, further including spring means normally causing said other part to stand about midway between the said abutments and yieldable to permit the said other part to engage either abutment to effect font stoppage obedient to finder stoppage by an actuated stop pin, release of the actuated stop pin after finder and font stoppage have occurred and after discontinuance of the action of the drive means has occurred permitting the finder to be moved by the spring means until said other part resumes its position between the abutments, the finder then being interposed in the path of actuation of the last said stop pin.

20. Automatic indexing apparatus for variably positioning a font for the selective reproduction in succession of characters thereon which correspond respectively to individually operable character keys, comprising a finder operatively associated with the keys, means establishing a reproduction position for the font-carried characters, means supporting and interlinking the finder and the font for a back-and-forth movement which brings them successively into position corresponding respectively to the keys, the respectively corresponding characters on the font being thereby brought successively into the exposure position, drive means, drive-control means responsive to the temporary operation of any character key for which the finder is not currently positioned for causing the drive means to move the finder and font in whichever direction of key-selecting movement is required to bring the finder into its position corresponding to the operated character key, stop means controlled by the operated key for stopping the finder in the finder position corresponding to the operated key, the font being responsively stopped in its position corresponding to the same key and with its corresponding font-carried character in the said reproduction position, means for discontinuing the action of the drive means when the finder and font have been stopped and for leaving them in the vicinity of their stopped position until a further key operation occurs, whereby the finder and font may require being moved in either direction by the drive means into any intermediate one of their said positions corresponding to a temporarily operated key, a pair of direction-control members carried with the finder and movable back and forth therewith, such members succeeding each other along their path of movement and being separated by a location representing the finder, a series of relatively fixed key-responsive members disposed along and to one side of the last said path and respectively corresponding to the keys, means for operating and restoring any key-responsive member responsive to the operation and restoration of its corresponding key, the operation of any key-responsive member bringing it effectively toward the last said path and causing it to operatively engage either of the said direction-control members with which it is currently opposed, means included in the said drive-control means and responsive to either such operative engagement for causing the said moving action of the drive means to take place in one direction or the other, depending upon which direction-control member is in a position to be operatively engaged by the key-responsive member operated by the next character key to be operated.

21. Apparatus according to claim 20, wherein the finder is at the said location separating said direction-control members but is offset from the direction-control members toward the said key-responsive members, said key-responsive members also comprising said stop means.

22. Apparatus according to claim 21, wherein said key-responsive members are each an electrical conducting member connected to one pole of a current source, said key-responsive members and said finder being electrical control members insulated from each other and from the key-responsive members, whereby said operation of any key-responsive member other than the one for which the finder and font are positioned connects said one pole of the current source to the then associated direction control member to energize it by contact therewith, and engagement between the actuated key-responsive member and the finder connecting said one pole of the current source to the finder to energize it, said means for causing the moving action of the drive means to occur in respective directions comprising a pair of devices operatively associated with the other pole of the current source and connected to be responsive respectively to energization of the direction-control members, and the said means for discontinuing the action of the drive means comprising a further device operatively associated with the other pole of the current source and connected to be responsive to the said energization of the finder.

23. Apparatus according to claim 20, wherein said direction-control members comprise electrical contactors either of which is rendered active by operative engagement thereof by an operated key-responsive member, said means for causing the moving action of the said drive-control means to occur in a direction according to the operatively engaged direction-control member comprising apparatus capable of giving alternative responses corresponding to the directions of movement, and means operatively connecting the electrical contactors to said apparatus to effect such alternative responses thereof.

24. Apparatus according to claim 23, wherein said means for discontinuing the action of the drive means includes electro-responsive means, the said finder including a drive-control contactor rendered active by engagement between the finder and any operated one of said key-responsive means, and circuit means for causing said electro-responsive means to act responsive to the drive-control contactor being rendered active.

References Cited in the file of this patent

UNITED STATES PATENTS 2,207,265　　Ogden　　July 9, 1940